(12) United States Patent
Cho et al.

(10) Patent No.: US 11,768,270 B2
(45) Date of Patent: Sep. 26, 2023

(54) RADAR SYSTEM AND RADAR SENSING SYSTEM HAVING THE SAME

(71) Applicant: HL KLEMOVE CORP., Incheon (KR)

(72) Inventors: Hyeon Dong Cho, Gyeonggi-do (KR); HanYeol Yu, Gyeonggi-do (KR); Jong Gyu Park, Gyeonggi-do (KR); Su Han Kim, Gyeonggi-do (KR); Woo Young Kim, Gyeonggi-do (KR)

(73) Assignee: HL KLEMOVE CORP., Incheon (KR)

( * ) Notice: Subject to any disclaimer, the term of this patent is extended or adjusted under 35 U.S.C. 154(b) by 277 days.

(21) Appl. No.: 16/596,651

(22) Filed: Oct. 8, 2019

(65) Prior Publication Data
US 2020/0110155 A1 Apr. 9, 2020

(30) Foreign Application Priority Data
Oct. 8, 2018 (KR) .................... 10-2018-0120083

(51) Int. Cl.
*G01S 7/40* (2006.01)
*G01S 13/931* (2020.01)

(52) U.S. Cl.
CPC .......... *G01S 7/4026* (2013.01); *G01S 13/931* (2013.01); *G01S 7/4043* (2021.05); *G01S 2013/93271* (2020.01); *G01S 2013/93274* (2020.01)

(58) Field of Classification Search
CPC ............... G01S 7/4026; G01S 13/931; G01S 2013/93274; G01S 2013/93271; G01S 7/4043
See application file for complete search history.

(56) References Cited

U.S. PATENT DOCUMENTS

| | | | | |
|---|---|---|---|---|
| 7,692,588 B2* | 4/2010 | Beer | .................... | H01Q 9/0407 343/700 MS |
| 8,022,861 B2* | 9/2011 | Margomenos | ....... | H01Q 21/065 343/700 R |
| 8,305,259 B2* | 11/2012 | Margomenos | .......... | G01S 13/86 343/700 R |
| 9,583,827 B2* | 2/2017 | Hulsmann | ............ | H01Q 19/062 |
| 10,473,754 B2* | 11/2019 | Park | ........................ | G01S 7/028 |
| 2001/0050603 A1* | 12/2001 | Bergstedt | ............... | H05K 1/036 333/246 |
| 2003/0103009 A1* | 6/2003 | Schmidt | ............... | H01Q 9/0407 343/702 |
| 2008/0062038 A1* | 3/2008 | Ouchi | .................... | G01S 7/032 342/175 |
| 2013/0181864 A1* | 7/2013 | Kim | ....................... | G01S 13/931 29/601 |
| 2013/0222201 A1* | 8/2013 | Ma | ........................ | H01Q 1/246 343/834 |
| 2015/0056845 A1* | 2/2015 | Tanaka | ................. | H05K 5/0043 439/377 |
| 2015/0171511 A1* | 6/2015 | Pleva | .................... | G01S 13/931 343/841 |

(Continued)

*Primary Examiner* — Peter M Bythrow
*Assistant Examiner* — Nazra Nur Waheed
(74) *Attorney, Agent, or Firm* — Ladas & Parry, LLP

(57) ABSTRACT

According to a radar system according to these embodiments, by mounting a radar antenna, an RF device, and a controller on an upper face and a lower face of a circuit board, the size and the cost can be reduced by decreasing the number of constituent components, and the reliability and the durability can be improved by discharging heat generated in the circuit board to the outside.

18 Claims, 10 Drawing Sheets

(56) References Cited

U.S. PATENT DOCUMENTS

2015/0331087 A1\* 11/2015 Philipp ................ H05K 5/0056
  361/752
2016/0268693 A1\* 9/2016 Ding .................... H01Q 13/206

\* cited by examiner

RADAR SYSTEM AND RADAR SENSING SYSTEM HAVING THE SAME

CROSS-REFERENCE TO RELATED APPLICATION

This application claims priority from Korean Patent Application No. 10-2018-0120083, filed on Oct. 8, 2018, which is hereby incorporated by reference for all purposes as if fully set forth herein.

BACKGROUND OF THE INVENTION

Field of the Invention

Embodiments relate to a radar system and a radar sensing system having this radar system, and more particularly, to a radar system and a radar sensing system having this radar system reducing a size and a cost by decreasing the number of constituent components by mounting a radar antenna, an RF device, and a controller on an upper face and a lower face of a circuit board and improving reliability and durability by discharging heat generated in the circuit board to the outside.

Description of Related Art

An electric control unit (ECU) electronically controlling various devices is included in a vehicle and performs a control function for improving safety, a steering sense, and the like of the vehicle by being provided with information from a sensor, a switch, or the like installed in the vehicle and processing the provided information. Particularly, a radar system detects a distance between the vehicle and a surrounding object and the like by discharging an electromagnetic wave and receiving the electromagnetic wave that is reflected and returned.

However, in a conventional radar system, a circuit board in which a radar antenna transmitting/receiving an electromagnetic wave is mounted and a circuit board in which a controller and the like are mounted are separately provided, and a base plate is provided between both the circuit boards. Accordingly, the number of components becomes large, and there is a problem in that it is difficult to manufacture the radar system, the cost is high, and the size of the radar system increases.

In addition, there is a problem in that the reliability and the durability of the radar system may be reduced due to heat generated by electronic components mounted in the circuit boards.

SUMMARY OF THE INVENTION

Embodiments have been proposed on the background described above, and an object thereof is to reduce the size and the cost by decreasing the number of constituent components by mounting a radar antenna, an RF device, and a controller in an upper face and a lower face of a circuit board and improve the reliability and the durability by discharging heat generated in the circuit board to the outside.

According to these embodiments, a radar system including a housing of which an upper side is open and with which a radome is coupled, a circuit board that is provided inside the housing and includes a radar antenna and an RF device mounted on an upper face and a controller mounted on a lower face, and an RF device cover that covers the RF device and is supported at the circuit board can be provided.

According to these embodiments, by mounting a radar antenna, an RF device, and a controller on an upper face and a lower face of a circuit board, the size and the cost can be reduced by decreasing the number of constituent components, and the reliability and the durability can be improved by discharging heat generated in the circuit board to the outside.

DETAILED DESCRIPTION OF THE INVENTION

Figure 1:
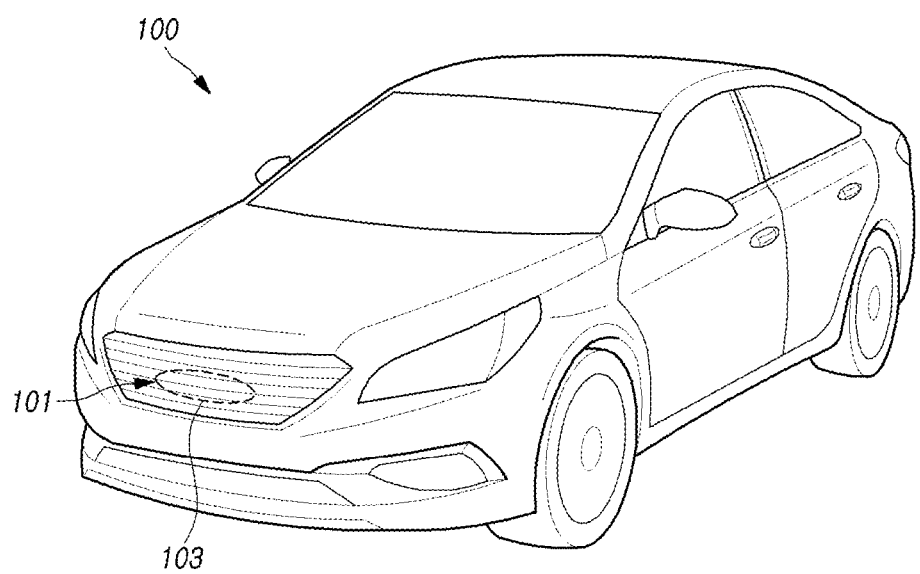
FIG. 1 is a perspective view illustrating one example in which a radar system according to these embodiments and a radar sensing system having this radar system are mounted in a vehicle.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 2:
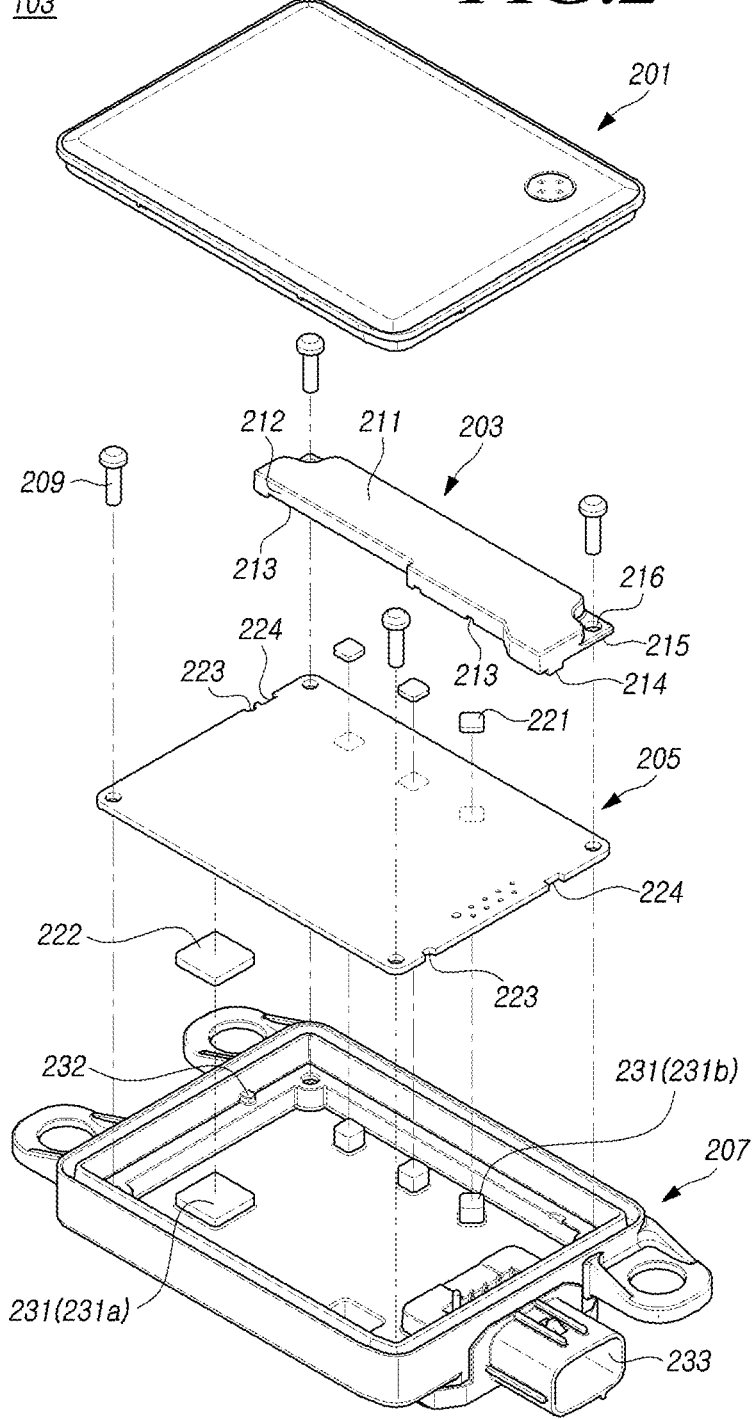
FIG. 2 is an exploded perspective view of a radar electronic control unit according to these embodiments.
Figure 3:
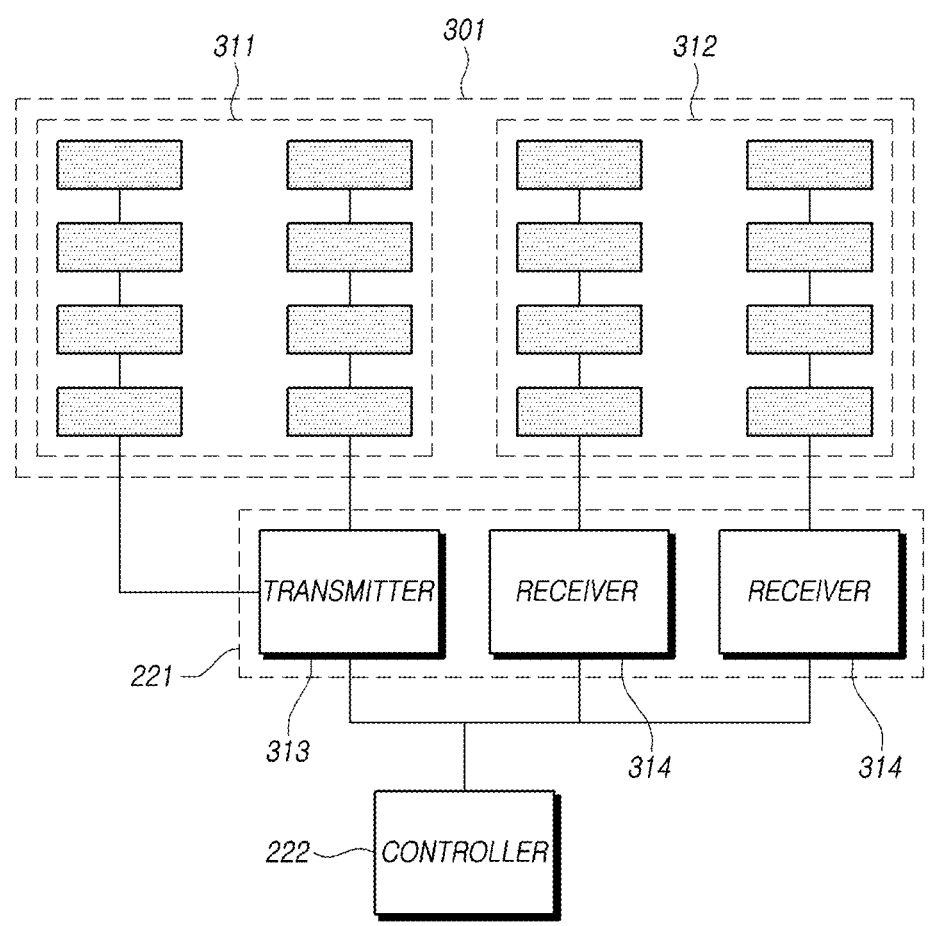
FIG. 3 is a circuit configuration diagram of a radar electronic control unit according to these embodiments.
Figure 4:
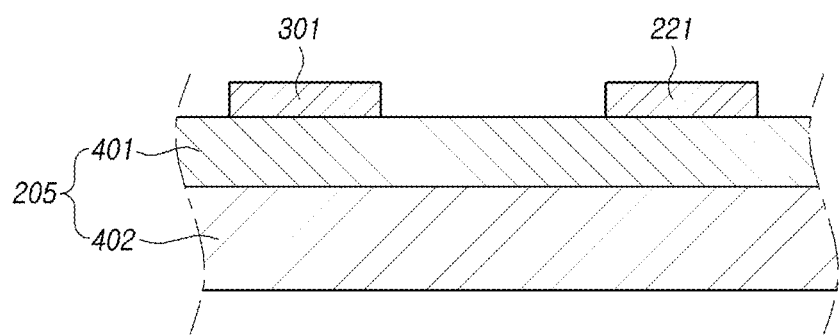
FIG. 4 is a cross-sectional view of a part of FIG. 2.
Figure 7:
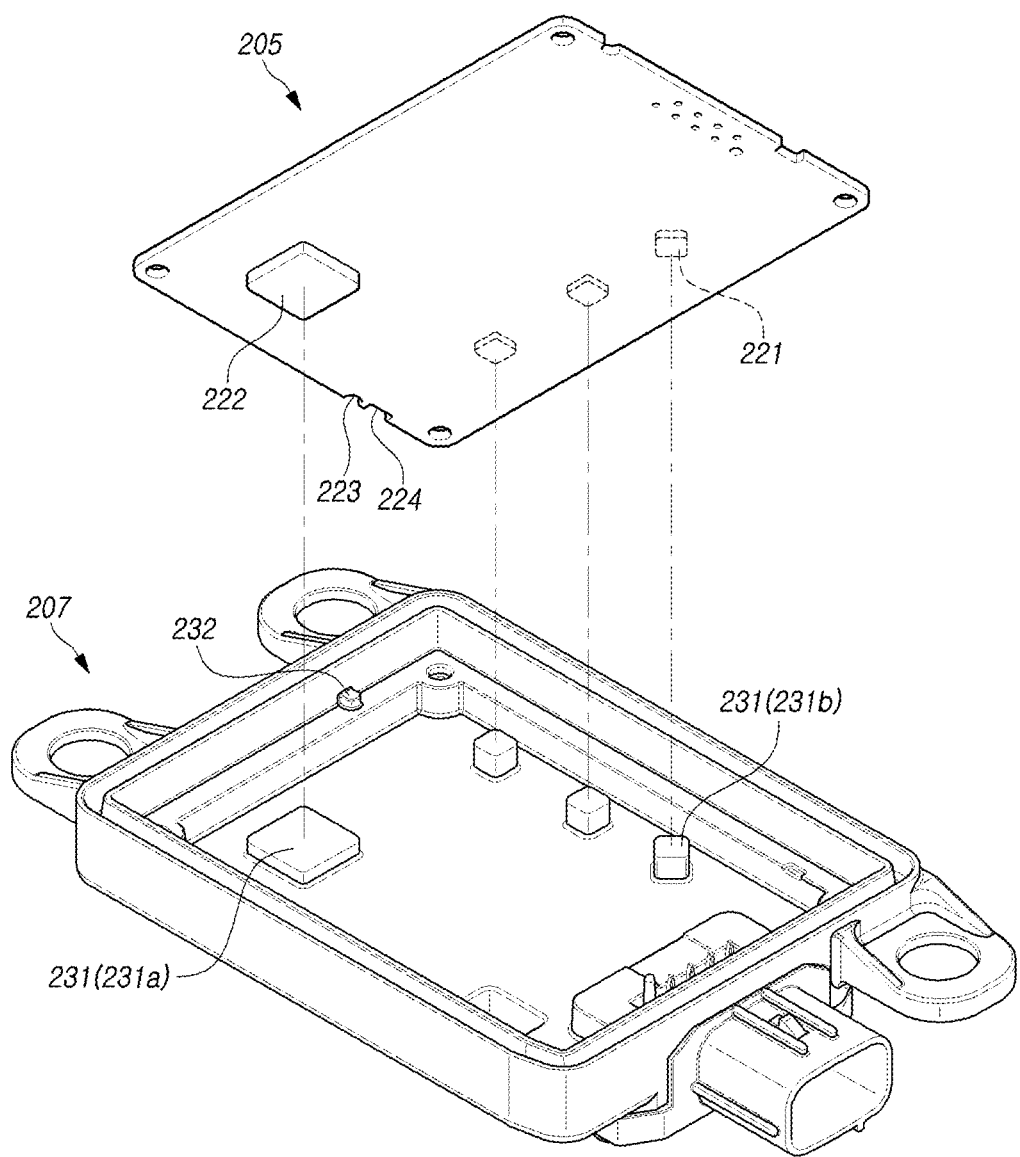
Figure 8:
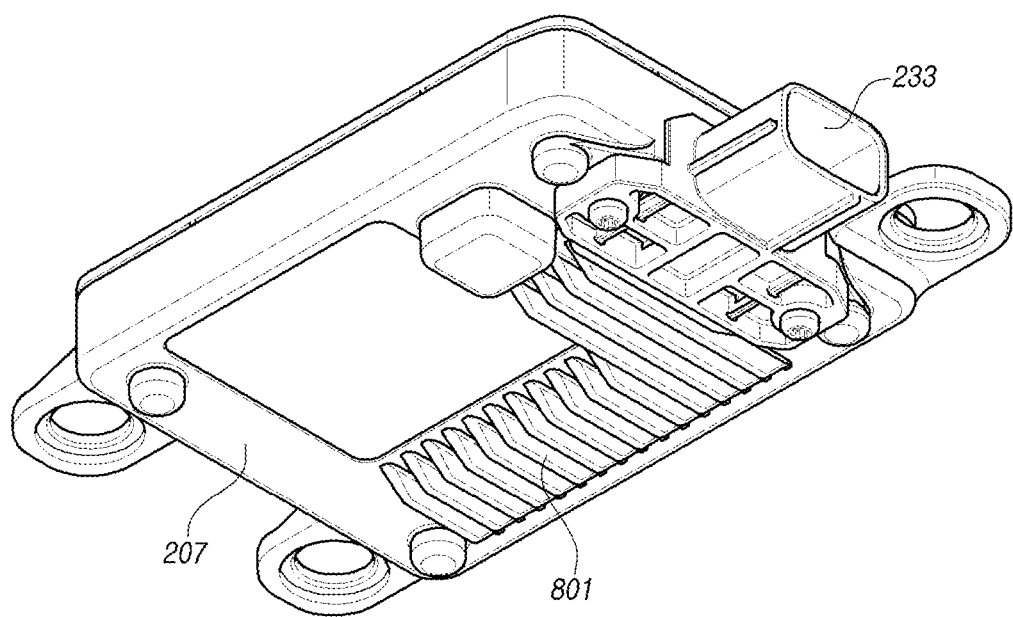
Figure 9:
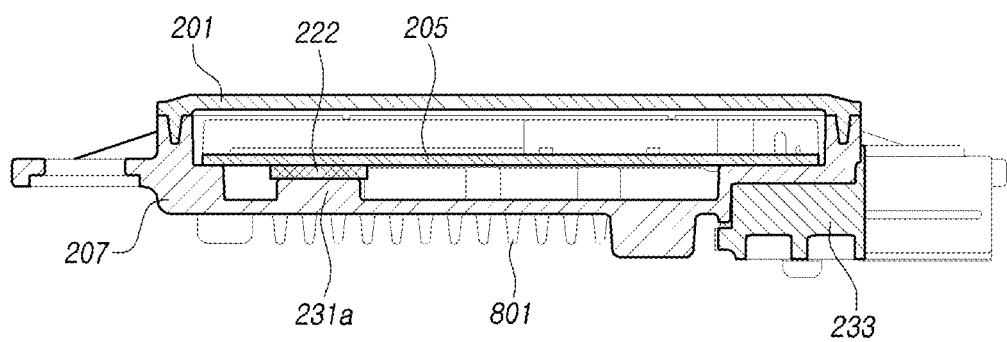
FIGS. 9 and 10 are cross-sectional views of parts of a coupled state illustrated in FIG. 2.
Figure 10:
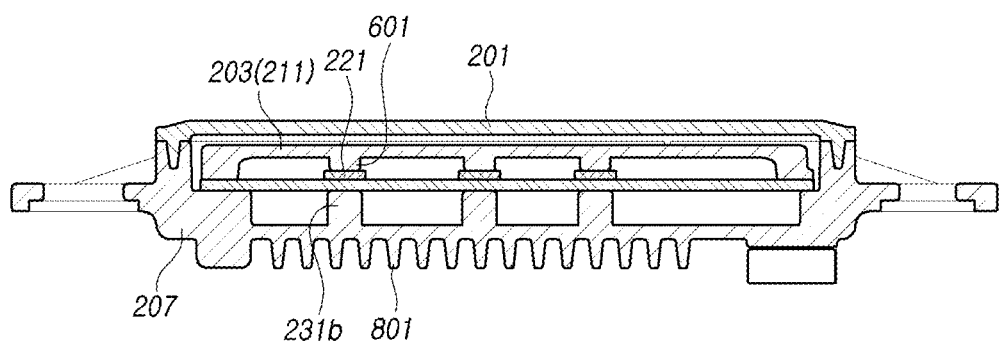

FIG. 1 is a perspective view illustrating one example in which a radar system according to these embodiments and a radar sensing system having this radar system are mounted in a vehicle, FIG. 2 is an exploded perspective view of a radar electronic control unit according to these embodiments, FIG. 3 is a circuit configuration diagram of a radar electronic control unit according to these embodiments, FIG. 4 is a cross-sectional view of a part of FIG. 2, FIGS. 5 to 8 are perspective views of parts of FIG. 2, and FIGS. 9 and 10 are cross-sectional views of parts of a coupled state illustrated in FIG. 2.

Hereinafter, description will be presented with reference to FIG. 1.

A radar sensing system 101 according to these embodiments includes at least one radar system 103, for example, may include one or more of a front-side detection radar system mounted on a front side of a vehicle, a rear-side detection radar system mounted on a rear side of the vehicle, and a lateral side or lateral rear-side detection radar system mounted in each lateral side of the vehicle. Such a radar sensing system 101 may process data by analyzing a transmission signal and a reception signal and detect information of an object in accordance therewith and may include an electronic or control unit (ECU) or a process for such operations. For data transmission or signal communication from the radar system 103 to the ECU, a communication link such as an appropriate vehicle network bus may be used.

Hereinafter, description will be presented with reference to FIGS. 2 to 10.

According to these embodiments, a radar system 103 including a housing 207 of which an upper side is open and with which a radome 201 is coupled, a circuit board 205 that is provided inside the housing 207 and includes a radar antenna 301 and an RF device 221 mounted on an upper face and a controller 222 mounted on a lower face, and a cavity 203 that covers the RF device 221 and is supported by the circuit board 205 can be provided.

In the radar apparatus 103, the circuit board 205 in which the radar antenna 301, the RF device 221, and the controller 222 are mounted for recognizing a distance, a relative speed, and the like between the vehicle 100 and a surrounding object is provided.

The radar sensing system 101 may be installed on the front side of the vehicle 100 and, in such a case, the radar system 103 may be provided inside a front bumper, a front grill, or the like of the vehicle 100. As described above, the radar sensing system 101 may be installed not only on the front side of the vehicle 100 but also on the lateral side or the rear side and detect a lateral-side area or a rear-side area of the vehicle 100 and, in such a case, the radar system 103 may be provided inside a side mirror housing, a rear bumper, or the like of the vehicle 100.

The radome 201 is coupled with the housing 207 and is directed toward the outside of the vehicle 100 at a position at which the radar system 103 is installed. In other words, the radome 201 is directed toward the front side of the vehicle 100 in a case in which the radar system 103 is installed on the front side of the vehicle 100, and the radome 201 is directed toward the lateral side or the rear side of the vehicle 100 in a case in which the radar system 103 is installed on the lateral side or the rear side of the vehicle 100.

As described above, the radome 201 is composed of a material that can attenuate a radar signal that is transmitted or received, and the radome 201 may be configured in a front/rear bumper, a grill, or a lateral-side vehicle body of the vehicle or an external surface of a vehicle constituent element.

In other words, the radome 201 of the radar system 103 may be disposed inside a vehicle grill, a bumper, a vehicle body, or the like or may be disposed in a part of a component configuring an external surface of the vehicle such as a vehicle grill, a bumper, or a part of the vehicle body, whereby the convenience of mounting of the radar system 103 can be provided while a sense of beauty of the vehicle is improved.

Referring to FIG. 3, the controller 222 transmits a radar signal or receives a radar signal by controlling the RF device 221, in other words, a control signal of the controller 222 is amplified and converted by the RF device 221, the radar signal is transmitted through the radar antenna 301, and a radar signal received by the radar antenna 301 has noise removed therefrom and is amplified by the RF device 221 and is transmitted to the controller 222.

In addition, the controller 222 processes a radar signal that has been transmitted or received by the RF device 221 senses an outside area of the vehicle 100. The controller 222 compares a transmitted radar signal with a received radar signal, determines a distance, a relative speed, and the like between the vehicle 100 and a surrounding object, and transmits control signals used for controlling various elements of the vehicle 100 through a connector 233.

In the radar system 103 according to these embodiments, the radar antenna 301 and the RF device 221 are mounted on the upper face of the circuit board 205, the controller 222 is mounted on the lower face of the circuit board 205, and only one circuit board 205 is provided inside the housing 207. Accordingly, when the radar system 103 is compared with a conventional radar system in which a circuit board in which an antenna and the like are mounted and a circuit board in which a controller and the like are mounted are included, and components such as a base plate and the like are included for supporting the circuit boards and the like, the number of constituent components is decreased, and accordingly, the cost is reduced, and the size of the radar system 103 is decreased, whereby installation thereof can be easily performed.

Although not illustrated in the drawing, a memory, a power supply, and the like are further provided on the lower face of the circuit board 205.

Instead of a base plate provided for heat dissipation and supporting circuit boards in a conventional radar system, protrusions 601, supporters 231, radiation fins 801 support the circuit board 205 and discharge heat generated by the circuit board 205 in the radar system 103 according to these embodiments.

The upper face of the circuit board 205 is divided into an area in which the radar antenna 301 is mounted and an area in which the RF device 221 is mounted, and the RF device cover 203 covers only the area in which the RF device 221 is mounted and protects the RF device 221.

The RF device cover 203 is formed using a metal material that shields radar signals such that the radar signals transmitted or received by the radar antenna 301 through the radome 201 are not delivered to the RF device 221, and, for example, a material such as aluminum may be used.

In other words, the RF device cover 203 is provided not to cover the area in which the radar antenna 301 is mounted on the upper face of the circuit board 205 and cover only the area in which the RF device 221 is mounted, whereby the radar antenna 301 transmits or receives radar signals through the radome 201, and such radar signals are not delivered to the RF device 221.

As will be described later, the radar antenna 301 and the RF device 221 are connected as a circuit through a groove 213 formed in the RF device cover 203, and, although not illustrated in the drawing, for example, the RF device 221 and the controller 222 may be connected as a circuit by vertically passing through the circuit board 205.

In addition, although an embodiment in which three RF devices 221 configured by one transmitter 313 and two receivers 314 are mounted is illustrated in the drawing, the configuration is not limited thereto. Thus, as one example, RF devices may be configured by two transmitters 313 and one receiver 314, or one RF device 221 may perform the roles of both the transmitter 313 and the receiver 314.

At this time, the transmitter 313 is connected to a transmission antenna 311 and transmits radar signals, and the receiver 314 is connected to a reception antenna 312 and receives radar signals.

One or more transmission antennas 311 and one or more reception antennas 312 are provided, and, as the numbers of transmission antennas 311 and reception antennas 312 are increased, the performance of the radar system 103 is further improved.

In other words, in a case in which a plurality of transmission antennas 311 and a plurality of reception antennas 312 are provided, the radar system 103 can sense not only a distance between the vehicle 100 and a surrounding object of the vehicle 100 but also information such as a direction, an angle, or the like of the surrounding object from the vehicle 100.

In addition, positions, directions, and the like in which the RF devices 221 are disposed in the circuit board 205 may be changed in accordance with a circuit configuration and are not necessarily limited to those according to the embodiments illustrated in the drawing.

Although an embodiment in which the controller 222 is realized by one chip is illustrated in the drawing, the configuration is not limited thereto. Thus, the controller 222 may be realized by two or more chips.

By referring to FIG. 4, an upper layer part 401 of the circuit board 205 may be formed using a material having a dielectric constant lower than the lower layer part 402.

In other words, while the radar antenna 301 needs to be mounted using a dielectric having a low dielectric constant such that a loss in a radar signal is small when the radar signal is transmitted or received by the radar antenna 301, in the radar system 103 according to these embodiments, the radar antenna 301 is mounted on the upper face of the circuit board 205, and the controller 222 is mounted on the lower face. Accordingly, by forming the upper layer part 401 of the circuit board 205 using a material having a dielectric constant lower than that of the lower layer part 402, a loss in the radar signal can be further decreased.

The upper layer part 401 and the lower layer part 402 of the circuit board 205 are manufactured using mutually-different materials, and radar antenna 301 and the RF devices 221 are mounted in the upper layer part 401 formed using a material having a dielectric constant lower than that of the lower layer part 402.

As one example, the lower layer part 402 of the circuit board 205 may be formed using an FR4 material that is generally used, and the upper layer part 401 may be formed using a Rogers RO3003 material having a dielectric constant lower than that of the FR4 material.

Meanwhile, as described above, since a base plate of a conventional radar system is not provided in the radar system 103 according to these embodiments, the circuit board 205 is directly coupled with the housing 207, and the circuit board 205 may be fastened to the housing 207 using a screw together with the RF device cover 203.

In other words, a coupling hole 216 that vertically passes through the RF device cover 203 is formed in the RF device cover 203, and a bolt 209 inserted into the coupling hole 216 may be coupled with the housing 207 through the circuit board 205.

Such a coupling hole 216 may be formed to vertically pass through a coupler 215 in the coupler 215 that is formed to horizontally extend from a side face part 212 to be described later.

Meanwhile, an insertion groove 223 and an insertion protrusion 232 are provided respectively in the circuit board 205 and the housing 207, and the circuit board 205 is fully seated on the housing 207 with the insertion groove 223 and the insertion protrusion 232 being engaged with each other before the circuit board 205 is fastened to the housing 207 using a screw. Similarly, a guide protrusion 214 and a guide groove 224 may be provided such that the RF device cover 203 is fully seated before being fastened to the circuit board 205 using a screw.

In other words, the RF device cover 203 may include a guide protrusion 214 protruding to the lower side, and a guide groove 224 into which the guide protrusion 214 is inserted may be included in the circuit board 205, and the RF device cover 203 may be fully seated on the circuit board 205 by inserting the guide protrusion 214 into the guide groove 224 and be fastened to the housing 207 using a bolt 209.

Such a guide protrusion 214 may be formed to protrude to the lower side from the side face part 212 to be described later, and the guide groove 224 may be formed in a frame of the circuit board 205.

In other words, as a sequence for assembling the housing 207, the circuit board 205, and the RF device cover 203, for example, the circuit board 205 is fully seated on the housing 207 by inserting the insertion protrusion 232 into the insertion groove 223, and the RF device cover 203 is fully seated on the circuit board 205 by inserting the guide protrusion 214 into the guide groove 224, and then, the circuit board 205 and the RF device cover 203 may be coupled with the housing 207 by inserting the bolt 209 into the coupling hole 216 to be fastened to the housing 207.

Meanwhile, the RF device cover 203 may include an upper face part 211 that is separated away from the circuit board 205 and a side face part 212 that protrudes from the frame of the upper face part 211 to the lower side and is supported by the circuit board 205.

In other words, the side face part 212 is formed to enclose an area in which the RF device 221 is included in the circuit board 205, the upper face part 211 is supported by the side face part 212 and is vertically separate from the upper face of the circuit board 205, and accordingly, the RF device cover 203 has an open lower side and has an empty space formed inside thereof, and the RF device 221 is protected by being positioned on the inner side of the RF device cover 203.

At this time, as described above, the coupling hole 216 may be formed to vertically pass through the coupler 215 at the coupler 215 that horizontally extends from a lower end of the side face part 212. In other words, the coupler 215 is not separate from the upper face of the circuit board 205 and is supported by the upper face of the circuit board 205 when the RF device cover 203 is fully seated on the circuit board 205.

Figure 5:
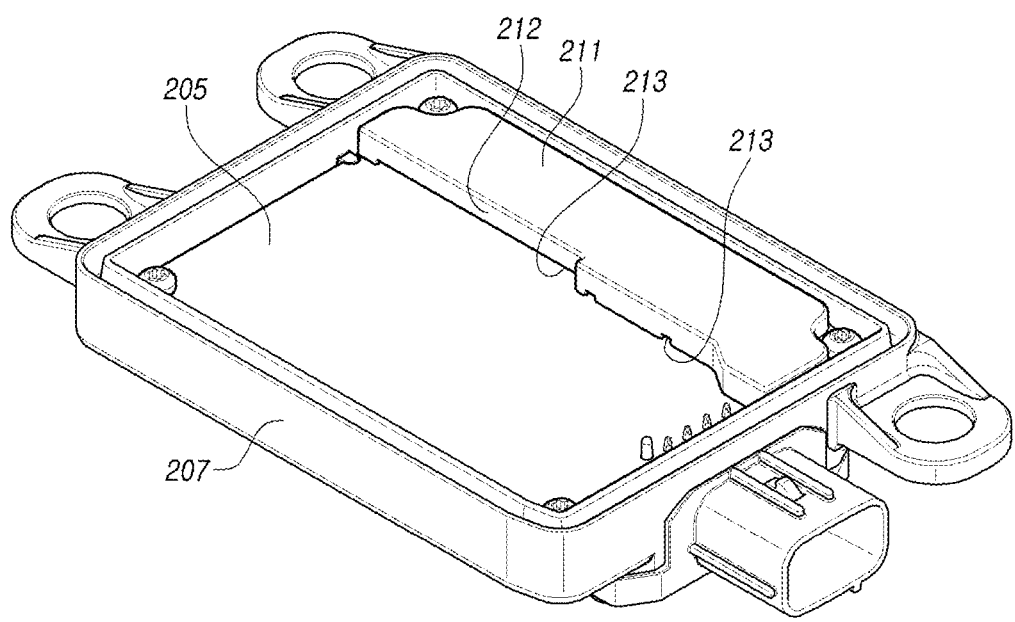
FIGS. 5 to 8 are perspective views of parts of FIG. 2.

Thereafter, referring to FIG. 5, the groove 213 is formed in the side face part 212, and a part of the side face part 212 is separated from the circuit board 205, and accordingly, the radar antenna 301 and the RF device 221, which are formed on the upper face of the circuit board 205, are connected as a circuit through the groove 213.

In other words, the upper face of the circuit board 205 is divided into an area in which the radar antenna 301 is mounted and an area in which the RF device 221 is mounted, and the RF device 221 is protected by the RF device cover 203. Accordingly, in order to connect the radar antenna 301 and the RF device 221 as a circuit on the upper face of the circuit board 205, it is necessary to form the groove 213 on the side face part 212 of the RF device cover 203.

By forming the groove 213 at a lower end of the side face part 212, the radar antenna 301 and the RF device 221 can be connected as a circuit through the groove 213.

Figure 6:
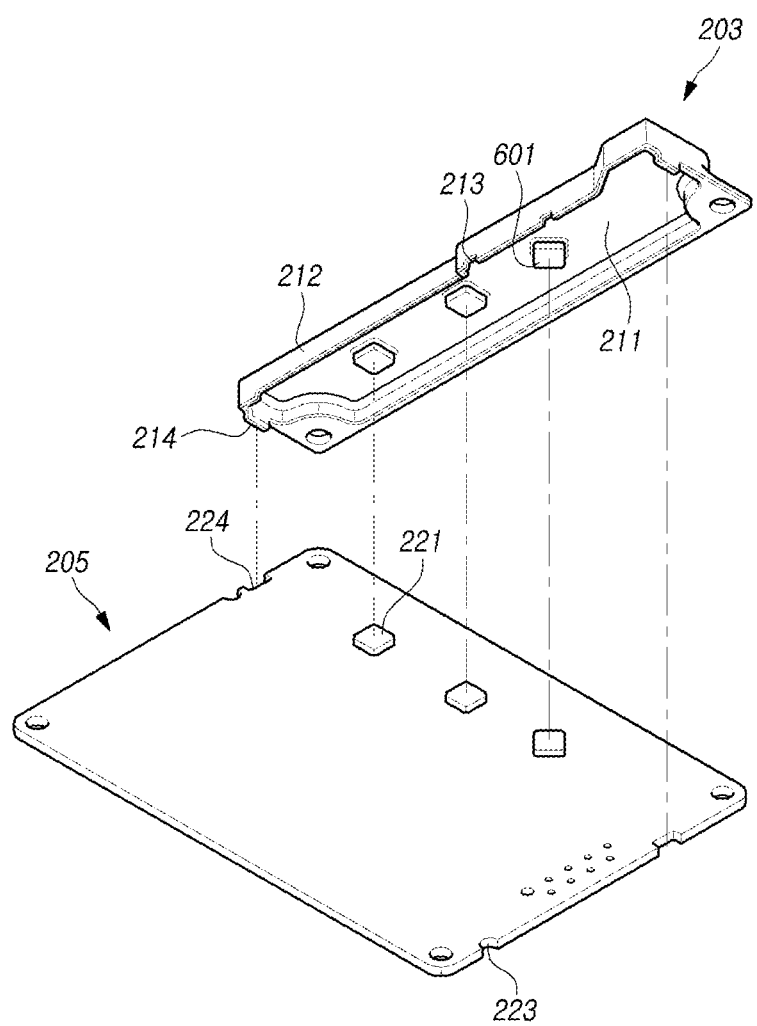

Referring to FIG. 6, the upper face part 211 includes the protrusions 601 protruding to the lower side, and the protrusions 601 may come into contact with RF devices 221.

As described above, in the radar system 103 according to these embodiments, a base plate of a conventional radar system is not included, and thus a structure for supporting the circuit board 205, protecting components mounted in the circuit board 205, and discharging heat generated by the circuit board 205 is necessary, and the protrusions 601 are provided for such a structure.

In other words, an end of each protrusion 601 is formed in a shape corresponding to the RF device 221, and, as described above, in a case in which the number of included RF devices 221 is changed, protrusions 601 corresponding to the number of RF devices 221 are provided such that each RF device 221 can be supported by the protrusion 601.

The RF device cover 203 is formed using a metal material for shielding the RF devices 221 from radar signals and thus has high thermal conductivity. Accordingly, when the RF device cover 203 is coupled with the housing 207, the protrusions 601 are supported by the RF devices 221, and heat generated by the RF devices 221 can be discharged to the outside.

At this time, by coating a space between the protrusion 601 and the RF device 221 with thermal grease, the thermal conductivity may be further increased.

Referring to FIG. 7, the housing 207 may include the supporters 231 that protrude to the upper side and are supported at the lower face of the circuit board 205.

While the circuit board 205 is coupled with the housing 207 using a screw, and only the frame is supported at the housing 207, the supporters 231 are provided for supporting the center of the circuit board 205, protecting components mounted on the lower face of the circuit board 205, and discharges heat.

Such supporters 231 may include a first supporter 231a supported at the controller 222 and a second supporter 231b supported at the circuit board 205 on a side opposite to the RF devices 221.

In other words, the first supporter 231a is directly supported at the controller 222 mounted on the lower face of the circuit board 205 and protects the controller 222 and discharges heat generated by the controller 222 (see FIG. 9), and the second supporter 231b is supported at the circuit board 205 on a side opposite to the RF devices 221 and can discharge heat generated by the RF devices 221 (see FIG. 10).

The protrusions 601 of the RF device cover 203 and the second supporter 231b of the housing 207 face each other with the RF devices 221 and the circuit board 205 interposed therebetween.

Similar to the protrusions 601, the first supporter 231a and the second supporter 231b are not limited to those of the embodiments illustrated in the drawing and may be provided differently in accordance with the number of chips composing each controller 222 and the number of RF devices 221.

At this time, the thermal conductivity may be further increased by coating a space between the first supporter 231a and the controller 222 and a space between the second supporter 231b and the circuit board 205.

Meanwhile, by referring to FIG. 8, heat generated by the circuit board 205 may be efficiently discharged to the outside the housing 207 by forming the housing 207 to have a large surface area by including radiation fins 801 protruding to the outer side.

A plurality of such radiation fins 801 may be provided on the lower face of the housing 207 and be disposed parallel to each other.

Meanwhile, although not illustrated in the drawing, a hot wire may be built in the radome 201.

In other words, when the radar system 103 according to these embodiments built in a bumper on the front side or the rear side of a vehicle is mounted and coupled, noise may be generated in radar signals transmitted/received by the radar antenna 301 due to snow stacked on the vehicle in a low-temperature environment, and by building a thermal wire in the radome 201 for preventing the generation of noise, the snow stacked on the vehicle can be removed, and the reliability of the radar antenna 301 can be improved.

According to the radar electronic control unit having such a shape, by mounting the radar antenna, the RF devices, and the controller on the upper face and the lower face of the circuit board, the number of constituent components is decreased, and the size of the radar electron control unit is decreased, and the cost can be reduced.

In addition, the RF device cover is provided and covers RF devices mounted on the upper face of the circuit board, and accordingly, the RF devices can be protected by shielding radar signals transmitted/received by the radar antenna.

Furthermore, the upper layer part of the circuit board is formed using a material having a dielectric constant lower than that of the lower layer part, and accordingly, the number of radar signals lost when the radar antenna mounted on the upper face of the circuit board transmits/receives the radar signals can be decreased.

In addition, by fastening the RF device cover to the housing using a screw together with the circuit board, the circuit board can be positioned and fixed between the RF device cover and the housing, and, by including the guide protrusions and the guide grooves respectively in the RF device cover and the circuit board, the RF device cover is fully seated on the circuit board and can be fastened to the housing using a screw in a simple manner.

In addition, by including the side face part and the upper face part in the RF device cover, RF devices are positioned on the inner side of the RF device cover and are protected, and, by forming a groove on the side face part, the radar antenna and the RF device can be connected as a circuit on the upper face of the circuit board.

Furthermore, the protrusions protruding to the lower side are provided on the upper face part, and the supporters protruding to the upper side are provided in the housing, and accordingly, the circuit board is supported inside the housing, and components mounted in the circuit board can be protected without providing a base plate, and, by discharging heat generated by the circuit board to the outside, the reliability and the durability of the radar system and the radar sensing system having the radar system can be improved.

In addition, by providing a plurality of radiation fins protruding to the outer side in the housing, the surface area of the housing is broadened, and heat can be efficiently discharged.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

REFERENCE SIGNS LIST

- 101: radar sensing system
- 103: radar system
- 203: RF device cover
- 205: circuit board
- 207: housing
- 211: upper face part
- 212: side face part
- 213: groove
- 214: guide protrusion
- 221: RF device
- 222: controller
- 224: guide groove
- 231: supporter
- 301: radar antenna
- 401: upper layer part
- 402: lower layer part
- 601: protrusion
- 801: radiation fin

What is claimed is:

1. A radar system comprising:
   a housing having an open side with which a radome is coupled;
   a circuit board provided inside the housing, wherein a radar antenna and one or more RF devices are mounted on a first surface of the circuit hoard and a controller is mounted on a second surface of the circuit board opposite to the first surface of the circuit board on which the radar antenna and the one or more RF devices are mounted; and
   a cavity that covers the one or more RF devices and is coupled to the circuit board so that the RF device is disposed between the cavity and the circuit board,
   wherein one or more supporters protrude from a surface of the housing toward the circuit board, and one or more protrusions protrude from a surface of the cavity toward one or more points where the one or more RF devices are mounted on the first surface of the circuit board.

2. The radar system according to claim 1, wherein the cavity is fastened to the housing using a screw.

3. The radar system according to claim 2, wherein a coupling hole vertically passing through the cavity is formed in the cavity, and a bolt inserted into the coupling hole passes through the circuit board and is coupled with the housing.

4. The radar system according to claim 3, wherein the cavity includes a guide protrusion protruding the lower side, and the circuit hoard includes a guide groove into which the guide protrusion is inserted.

5. The radar system according to claim 1, wherein the surface of the cavity includes an upper face part that is separate from the circuit board and the cavity comprises a side face part that protrudes to a lower side in a frame of the upper face part and is supported at the circuit board.

6. The radar system according to claim 5, wherein a groove is formed in the side face part, and a part of the side face part is separate from the circuit board.

7. The radar system according to claim 6, wherein the one or more protrusions protrude to the lower side, and the upper face part of the cavity includes the one or more protrusions protruding to the lower side.

8. The radar system according to claim 7, wherein the one or more protrusions comes into contact with the one or more RF devices.

9. The radar system according to claim 1, wherein the housing includes the one or more supporters that protrude to an upper side and is supported at the second surface of the circuit board.

10. The radar system according to claim 9, wherein the one or more supporters includes a first supporter supported at the controller.

11. The radar system according to claim 10, wherein the one or more supporters includes a second supporter that is supported at the circuit board on a side opposite to the one or more RF devices.

12. The radar system according to claim 1, wherein the housing includes a radiation fin protruding to an outer side.

13. The radar system according to claim 1, wherein the controller comprises one or more chips electrically connected with the one or more RF devices.

14. The radar system according to claim 1, wherein the first surface of the circuit board has a first area on which the radar antenna is mounted and a second area on which the one or more RF devices is mounted, and the cavity does not cover the first area of the circuit board on which the radar antenna is mounted, and covers the second area of the circuit board on which the one or more RF devices is mounted.

15. The radar system according to claim 1, wherein one or more other supporters protrude from the surface of the housing toward the one or more points where the one or more RF devices are mounted, and a direction in which the one or more other supporters protrude from the surface of the housing is opposite to a direction in which the one or more protrusions protrude from the surface of the cavity.

16. The radar system according to claim 1, wherein the one or more other supporters protruding from the surface of the housing are arranged in line with the one or more protrusions protruding from the surface of the cavity.

17. The radar system according to claim 1, wherein the one or more protrusions support the one or more RF devices and are provided on the surface of the cavity facing the one or more RF devices, and a number of the one or more protrusions supporting the one or more RF devices and provided on the surface of the cavity facing the one or more RF devices is equal to a number of the one or more RF devices such that each of the one or more protrusions provided on the surface of the cavity facing the one or more RF devices support a respective one of the one or more RF devices.

18. The radar system according to claim 1, wherein an upper layer part of the circuit board is formed using a material having a dielectric constant lower than that of a lower layer part of the circuit board.

* * * * *